(12) United States Patent
Kim et al.

(10) Patent No.: US 11,934,576 B2
(45) Date of Patent: *Mar. 19, 2024

(54) METHODS, SYSTEMS, AND NON-TRANSITORY COMPUTER-READABLE MEDIUMS FOR SSVEP DETECTION OPTIMIZATION

(71) Applicants: Toyota Motor Engineering & Manufacturing North America, Inc., Plano, TX (US); University of Connecticut Health Center, Farmington, CT (US)

(72) Inventors: Insoo Kim, Avon, CT (US); Hossein Hamidi Shishavan, New Britain, CT (US); Kia Golzari, Vernon, CT (US); Muhamed Farooq, Ann Arbor, MI (US); Ercan M. Dede, Ann Arbor, MI (US)

(73) Assignees: TOYOTA MOTOR ENGINEERING & MANUFACTURING NORTH AMERICA, INC., Plano, TX (US); UNIVERSITY OF CONNECTICUT HEALTH CENTER, Farmington, CT (US)

( * ) Notice: Subject to any disclaimer, the term of this patent is extended or adjusted under 35 U.S.C. 154(b) by 150 days.

This patent is subject to a terminal disclaimer.

(21) Appl. No.: 17/575,823

(22) Filed: Jan. 14, 2022

(65) Prior Publication Data

US 2023/0229235 A1 Jul. 20, 2023

(51) Int. Cl.
*G06F 3/01* (2006.01)

(52) U.S. Cl.
CPC .................................. *G06F 3/015* (2013.01)

(58) Field of Classification Search
CPC .................................. G06F 3/015; A61B 5/18
(Continued)

(56) References Cited

U.S. PATENT DOCUMENTS

| 9,476,830 | B2 * | 10/2016 | Pantazis | G01N 21/636 |
| 11,684,301 | B1 * | 6/2023 | Kim | A61B 5/316 |
| | | | | 340/576 |

(Continued)

FOREIGN PATENT DOCUMENTS

| CN | 102609090 B | 6/2014 |
| CN | 107346179 A | 11/2017 |

(Continued)

OTHER PUBLICATIONS (https://journals.plos.org/plosone/article?id=10.1371/journal.pone.0099235); Generating visual flickers for eliciting robust steady-state visual evoked potentials at flexible frequencies using monitor refresh rate, 12 pgs., Jun. 11, 2014.

*Primary Examiner* — Calvin C Ma
(74) *Attorney, Agent, or Firm* — DINSMORE & SHOHL LLP

(57) ABSTRACT

In accordance with one embodiment of the present disclosure, a method includes measuring brain activity for a target frequency and a second harmonic frequency based on a default value of display parameters for a plurality of icons, determining whether a strength of the target frequency and the second harmonic frequency are below a threshold level, and modifying one or more display parameters in response to the strength of the target frequency and the second harmonic frequency being below the threshold level.

19 Claims, 6 Drawing Sheets

(58) Field of Classification Search
USPC .......................................................... 345/156
See application file for complete search history.

(56) References Cited

U.S. PATENT DOCUMENTS

| | | | | |
|---|---|---|---|---|
| 2013/0144361 | A1* | 6/2013 | Towe | ................. A61N 1/36125 |
| | | | | 607/116 |
| 2016/0282939 | A1* | 9/2016 | Sørensen | ................. G06F 3/015 |
| 2018/0049662 | A1* | 2/2018 | Chen | .................... A61B 5/4064 |
| 2021/0240264 | A1 | 8/2021 | Wilson et al. | |
| 2022/0248949 | A1* | 8/2022 | Norton | ................. A61B 3/0008 |

FOREIGN PATENT DOCUMENTS

| | | |
|---|---|---|
| CN | 107390873 B | 3/2020 |
| WO | 2021019088 A1 | 2/2021 |

\* cited by examiner

METHODS, SYSTEMS, AND NON-TRANSITORY COMPUTER-READABLE MEDIUMS FOR SSVEP DETECTION OPTIMIZATION

TECHNICAL FIELD

The present disclosure relates to brain-computer interfaces (BCI), and more particularly to the optimization of brain activity collection in BCIs.

BACKGROUND

A BCI is a type of human-computer interaction that connects the brain to external electronic devices. One of the most effective methods for connecting the brain to an external electronic device is through the evocation and analysis of steady-state visually evoked potentials (SSVEP). SSVEP is brain activity that is a natural response to visual stimulation at specific frequencies. When the eye views a visual stimulus (e.g., an icon) flickering at a rate ranging from 3.5 Hz to 75 Hz, for example, the brain generates electrical activity at the same or multiples (i.e., harmonics) of the frequency of the visual stimulus. SSVEP-based BCI systems may utilize user interfaces having a plurality of icons for the user to interact with. Each icon may be flickering at a different frequency to evoke particular brain activity when viewed by a user. The brain activity may be correlated to the flicker frequency which may be further correlated to an interaction with an icon.

However, SSVEP-based BCI systems rely on detecting strong and clean signals of the user's brain activity to accurately determine which icon the user is intending to interact with. Visual distractions in the user's environment can affect the accuracy of such determination. For example, brain activity may be harder to elicit when the visual stimulus is on a transparent display or when there is reduced contrast between the visual stimulus and its background because activity in the background may affect the brain's ability to focus on the visual stimulus.

Therefore, efficient strategies for SSVEP detection that can overcome visual distractions and optimize SSVEP detection are desired.

SUMMARY

In accordance with one embodiment of the present disclosure, a method includes measuring brain activity for a target frequency and a second harmonic frequency based on a default value of display parameters for a plurality of icons, determining whether a strength of the target frequency and the second harmonic frequency are below a threshold level, and modifying one or more display parameters in response to the strength of the target frequency and the second harmonic frequency being below the threshold level.

In accordance with another embodiment of the present disclosure, a system includes a processor, an electronic display communicatively coupled to the processor, a brain activity sensor communicatively coupled to the processor, and a memory module communicatively coupled to the processor. The memory module has machine-readable instructions that, when executed by the processor, cause the processor to perform operations including measuring brain activity for a target frequency and a second harmonic frequency based on a default value of display parameters for a plurality of icons, determining whether a strength of the target frequency and the second harmonic frequency are below a threshold level, and modifying one or more display parameters in response to the strength of the target frequency and the second harmonic frequency being below the threshold level.

In accordance with yet another embodiment of the present disclosure, a non-transitory computer-readable medium has machine-readable instructions that, when executed by a processor, cause the processor to perform operations including measuring brain activity for a target frequency and a second harmonic frequency based on a default value of display parameters for a plurality of icons, determining whether a strength of the target frequency and the second harmonic frequency are below a threshold level, and modifying one or more display parameters in response to the strength of the target frequency and the second harmonic frequency being below the threshold level.

Although the concepts of the present disclosure are described herein with primary reference to automobiles, it is contemplated that the concepts will enjoy applicability to any electronic display having a user interface. For example, and not by way of limitation, it is contemplated that the concepts of the present disclosure will enjoy applicability to personal computers.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods, systems, and non-transitory computer-readable mediums having machine-readable instructions for SSVEP detection optimization. In embodiments disclosed herein, an SSVEP-based BCI may utilize an electronic display to present a user interface to a user. The user interface may have a plurality of flickering icons that invoke brain activity in a user when the user views an icon. SSVEP-based BCIs can overcome visual distractions and optimize SSVEP detection by modifying the presentation of the user interface to the user.

Modifying the presentation of the user interface may include calibrating a user interface to find the most optimal setting of parameters for maximizing the SSVEP signals at a target frequency and second harmonic of the target frequency for a particular user. Embodiments may monitor for a threshold level of brain activity at a target frequency and a second harmonic of the target frequency. Embodiments may also or instead monitor for a change in the background environment. When the brain activity at a target frequency and a second harmonic are not at the threshold and/or when the background environment has changed, the system may adjust display parameters until brain activity at the target frequency and the second harmonic have returned to a threshold level.

Figure 1:
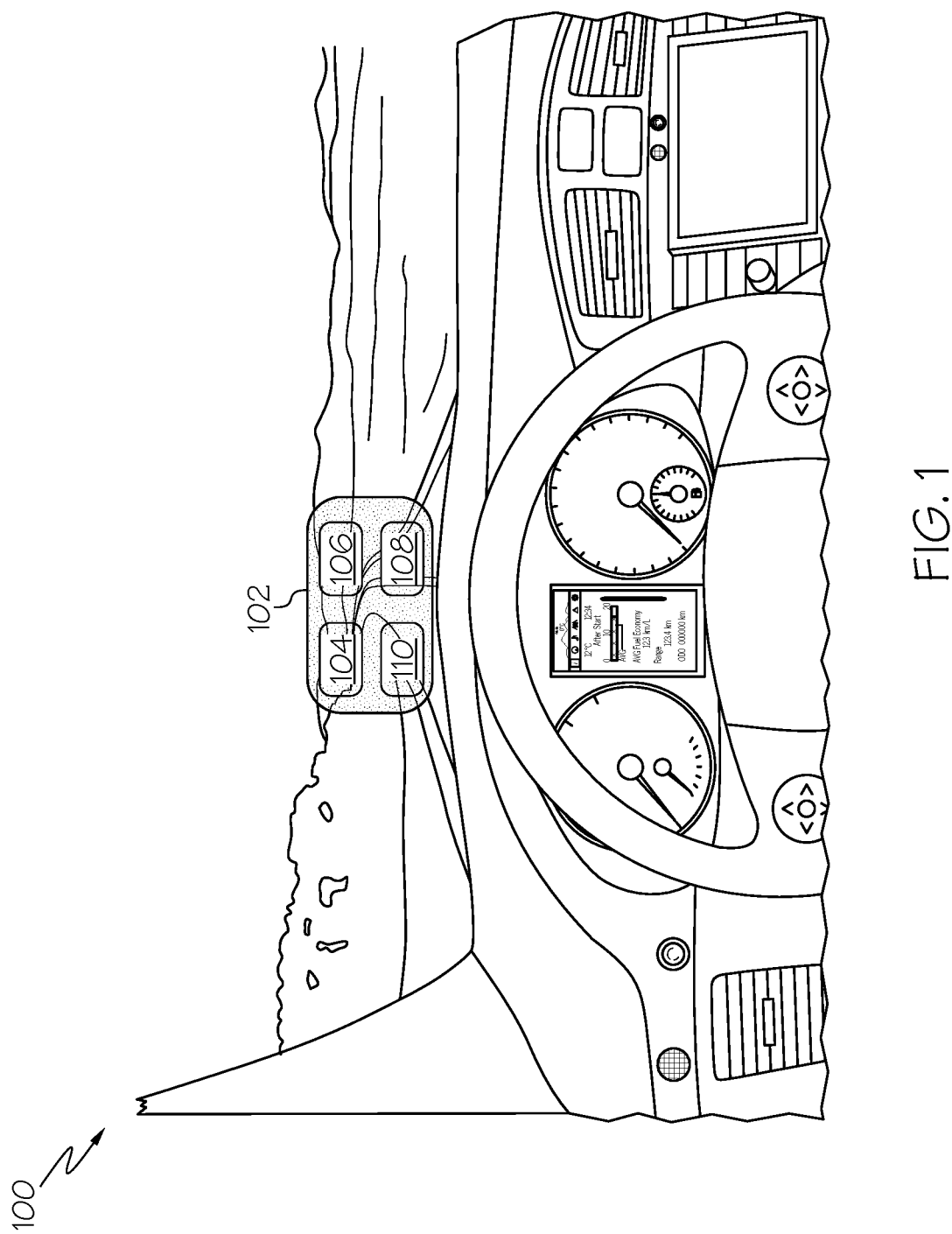
FIG. 1 depicts an illustrative scenario of a user viewing a heads up display (HUD), according to one or more embodiments shown and described herein.

Referring now to FIG. 1, a scenario 100 of a user viewing a head up display (HUD 102), is depicted. The HUD 102 may be an electronic display having a level of transparency. For example, the HUD 102 may be partially or fully transparent. Presented on the HUD 102 may be a user interface. The user interface may comprise a plurality of icons 104, 106, 108, 110. Each icon of the icons 104, 106, 108, 110 may flicker at a rate different from the other icons. The rate at which an icon flickers reflects the type and/or amount of brain activity that is evoked from the user when the user focuses on the icon. The user interface may also have a particular arrangement for the icons 104, 106, 108, 110 that may affect the type and/or amount of brain activity that is evoked from the user. For example, in scenario 100, the icons 104, 106, 108, 110 are in a 2×2 arrangement. The user interface may also have a particular color for the icons 104, 106, 108, 110 that may also affect the type and/or amount of brain activity that is evoked from the user. For example, in scenario 100, the icons 104, 106, 108, 110 all have the same neutral color. Unlike the flicker rate, the icons 104, 106, 108, 110 may have the same or different colors as each other. The user interface may also have a particular background color. The background color may be the color of the HUD 102 or sections thereof. For example, in scenario 100, the HUD 102 is the same neutral color as the icons 104, 106, 108, 110 but with more transparency. The background color may be the same or different as the color of the icons 104, 106, 108, 110. Any or all of the foregoing display parameters of the HUD 102 and/or icons may be modified simultaneously or sequentially until the brain activity is above a threshold level for the target and/or second harmonic frequencies of an icon.

In addition, the environment behind the HUD 102 may also affect the type and/or amount of brain activity that is evoked from the user. Because the HUD 102 may only occupy a small portion of the user's eyesight, the brain activity may be sensitive to the user's environment. Accordingly, embodiments may monitor ambient light and/or location to determine the level of environment activity. If the environment activity has changed, then the system may recalibrate the values of the display parameters of the HUD 102 to display the icons 104, 106, 108, 110 so as to maximize the detection of brain activity. Recalibration may include adjusting the HUD 102 to increase the contrast between the icons 104, 106, 108, 110 and the environment, including road conditions, lighting conditions, and scene complexity.

Figure 2:
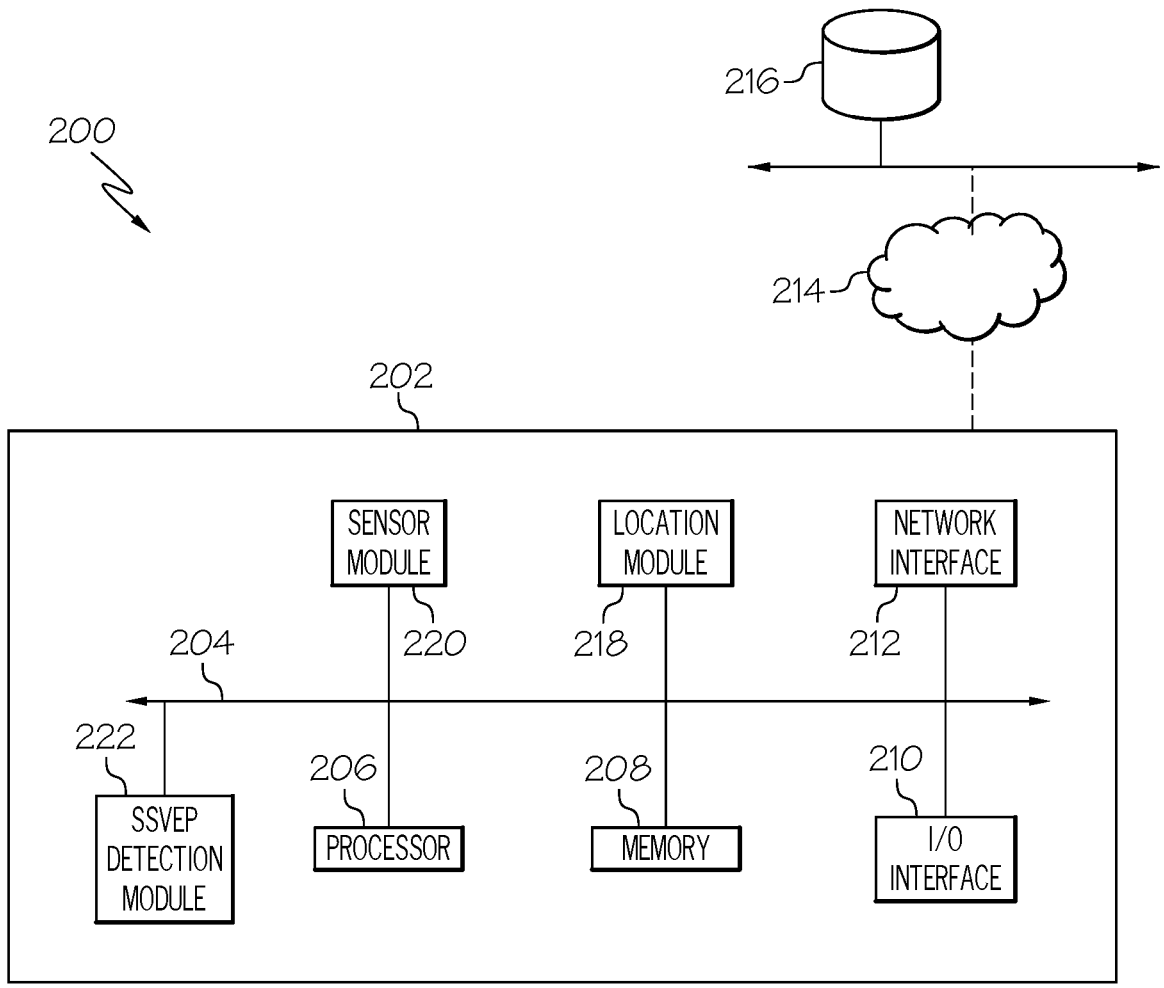
FIG. 2 depicts an illustrative system, according to one or more embodiments shown and described herein.

Referring now to FIG. 2, a system 200 for carrying out the methods described herein is depicted. The system 200 may include a computing device 202 for executing the methods described herein. The computing device 202 may be a vehicle or part of a vehicle. The computing device 202 may comprise a processor 206, a memory module 208, a network interface 212, an input/output interface (I/O interface 210), a location module 218, a sensor module 220, and an SSVEP detection module 222. The computing device 202 also may include a communication path 204 that communicatively connects the various components of the computing device 202. The computing device 202 may connect to external computing devices 216 via a network 214. It should be understood that the components of the computing device 202 described are exemplary and may contain more or less than the number of components shown in FIG. 2.

The processor 206 may include one or more processors that may be any device capable of executing machine-readable and executable instructions. Accordingly, each of the one or more processors of the processor 206 may be a controller, an integrated circuit, a microchip, or any other computing device. The processor 206 is coupled to the communication path 204 that provides signal connectivity between the various components of the computing device 202. Accordingly, the communication path 204 may communicatively couple any number of processors of the processor 206 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

The communication path 204 may be formed from any medium that is capable of transmitting a signal such as, e.g., conductive wires, conductive traces, optical waveguides, and the like. In some embodiments, the communication path 204 may facilitate the transmission of wireless signals, such as Wi-Fi, Bluetooth, Near-Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 208 is communicatively coupled to the communication path 204 and may contain one or more memory modules comprising RAM, ROM, flash memories, hard drives, or any device capable of storing machine-readable and executable instructions such that the machine-readable and executable instructions can be accessed by the processor 206. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory module 208. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The I/O interface 210 is coupled to the communication path 204 and may contain hardware for receiving input and/or providing output. Hardware for receiving input may include devices that send information to the processor 206. For example, a keyboard, mouse, scanner, touchscreen, and camera are all I/O devices because they provide input to the processor 206. Hardware for providing output may include devices from which data is sent. For example, an electronic display, speaker, and printer are all I/O devices because they output data from the processor 206.

A location module 218 is coupled to the communication path 204 such that the communication path 204 communicatively couples the location module 218 to other modules of the computing device 202. The location module 218 may comprise one or more antennas configured to receive signals from global positioning system (GPS) satellites. Specifically, in one embodiment, the location module 218 includes one or more conductive elements that interact with electromagnetic signals transmitted by GPS satellites. The received signal is transformed into a data signal indicative of the location (e.g., latitude and longitude) of the location module 218, and consequently, the computing device 202.

The sensor module 220 is coupled to the communication path 204 and communicatively coupled to the processor 206. The sensor module 220 may include sensors such as LiDAR sensors, RADAR sensors, optical sensors (e.g., cameras), laser sensors, proximity sensors, location sensors, and the like. The sensor module 220 may also include an ambient light sensor for measuring changes in a background environment. The sensor module 220 may further include sensors for measuring brain activity such as electroencephalography (EEG) sensors.

The computing device 202 also comprises network interface 212. The network interface 212 is communicatively coupled to the communication path 204. The network interface 212 can be any device capable of transmitting and/or receiving data via a network or other communication mechanisms. Accordingly, the network interface 212 can include a communication transceiver for sending and/or receiving any wired or wireless communication. For example, the network interface 212 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices. The network interface 212 communicatively connects the computing device 202 to external systems, such as external computing devices 216, via a network 214. The network 214 may be a wide area network, a local area network, a personal area network, a cellular network, a satellite network, and the like.

The system 200 may also include external computing devices 216. The external computing devices 216 may be one or more computing devices that may be in remote communication with the computing device 202 via network 214. The external computing devices 216 may include devices that operate beyond the computing device 202 such as desktop computers, laptop computers, smartphones, and any other type of computing device in communication with the computing device 202. The external computing devices 216 may also include services that operate beyond the computing device 202 that may be utilized by or may utilize the computing device 202, such as external databases, storage devices, computing platforms, and any other type of service.

The SSVEP detection module 222 may be a hardware module coupled to the communication path 204 and communicatively coupled to the processor 206. The SSVEP detection module 222 may also or instead be a set of instructions contained in the memory module 208. The SSVEP detection module 222 is configured to interact with an EEG sensor (e.g., sensor module 220) to measure brain activity for one or more frequencies and store and/or modify one or more display parameters of an electronic display (e.g., I/O interface 210). The SSVEP detection module 222 may also be configured to perform the methods as described herein.

It should be understood that the components illustrated in FIG. 2 are merely illustrative and are not intended to limit the scope of this disclosure. More specifically, while the components in FIG. 2 are illustrated as residing within computing device 202, this is a non-limiting example. In some embodiments, one or more of the components may reside external to computing device 202. In some embodiments, the computing device 202 may exist as a virtual machine operating within a host machine alongside other virtual machines, each of which shares the same computing resources belonging to the host machine.

Figure 3:
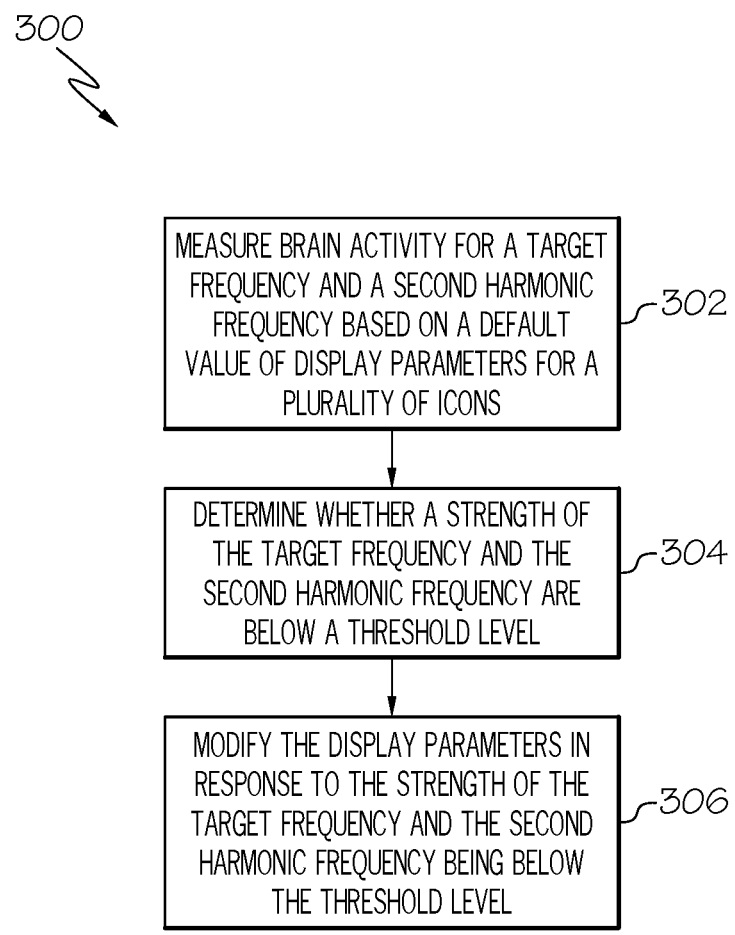
FIG. 3 depicts a flowchart of an illustrative method, according to one or more embodiments shown and described herein.

Referring now to FIG. 3, a flowchart of a method 300 for SSVEP detection optimization is depicted. With reference to FIG. 2, the method 300 may be performed by the system 200, particularly with SSVEP detection module 222. At block 302, the system 200 measures brain activity for a target frequency and a second harmonic frequency based on a default value of display parameters for a plurality of icons presented to a user. The EEG sensor of the sensor module 220 may be used to measure brain activity and an electronic display of the I/O interface 210 may display the icons to evoke brain activity in the user. The target frequency may be any frequency sufficient to evoke brain activity in a user. For example, a first icon may flicker at a target frequency of 10 Hz which may evoke EEG signals in the user that are recorded by the system 200. The display parameters for the plurality of icons comprise at least one of frequency, duty cycle, color, arrangement, position, background, and any other parameter that affects how the icons are displayed. The display parameters may each have a default value. The default values may be based on the user, a past configuration, a predetermined setting, and/or any other value such that, when the icons are initially presented to the user, the icons are presented according to the default display parameters.

At block 304, the system 200 determines whether the strength of the target frequency and the second harmonic frequency are below a threshold level. The evoked EEG brain activity may be processed to estimate its power at various frequencies. Methods for processing may include, for example, Welch power spectral density estimation. Methods may also generate a periodogram for analyzing amplitude characteristics as compared to frequency. The processing may reveal that, when the user is focusing on an icon, the brain activity may be stronger at the target frequency and multiples thereof (i.e., harmonics) than at any other frequency. For example, when the first icon flickers at a target frequency of 10 Hz, the EEG signals evoked in the user may be the strongest at 10 Hz and may also spike at the second harmonic frequency (i.e., 20 Hz), third harmonic frequency (i.e., 30 Hz), and so on. To reduce the detection time, however, the system 200 may be limited to determining the power of the brain activity at the target frequency and the second harmonic frequency. The threshold level may also be predetermined and set to an amount that is detectible by the system 200 while also distinguishable from frequencies that are not the target frequency or its harmonic frequencies.

In some embodiments, the system 200 may further measure brain activity for the third harmonic frequency. Although utilizing the second harmonic in addition to the target frequency can enhance the performance of the system 200, the amplitude of the target and/or the second harmonic frequency may not always be at an optimal level for SSVEP detection. To increase the amplitude of the target and/or the second harmonic frequency, the system 200 may modify display parameters so as to suppress the amplitude of the third harmonic frequency, which thereby may increase the amplitude of the second harmonic frequency. Accordingly, the system 200 may further measure brain activity for the third harmonic frequency. In embodiments that the system 200 measures brain activity for the third harmonic frequency, the threshold level may be greater than the third harmonic frequency to ensure that the target and second harmonic frequencies are stronger than the third harmonic frequency.

At block 306, the system 200 modifies the display parameters in response to the strength of the target frequency and the second harmonic frequency being below the threshold level. Modifying the display parameters may comprise modifying one or more display parameters of the display parameters until the strength of the target frequency and the second harmonic frequency are at the threshold level. Potential modifications of the display parameters will be discussed in more detail with regard to FIGS. 5A-6C. The purpose of the modifications is to suppress the amplitude of the third harmonic frequency and increase the amplitude of the second harmonic frequency. Modifications may include changing the icon colors, icon background colors, icon arrangement, icon alignment, and/or the like. The modifications may change one or more display parameters and re-determining the strength of the target frequency and the second harmonic frequency. The system 200 may continue to modify one or more display parameters until the system 200 determines that the strength of the target frequency and the second harmonic frequency are at or above the threshold level.

In some embodiments, the default value of the display parameters may be changed to the modified display parameters. The modified display parameters determined in block 306 may become the default display parameters used in block 302 in subsequent iterations. The system 200 may also maintain a set of profiles having the modified display parameters. The profiles may be based on the background environment. For example, a nighttime background environment may affect the brain activity of a user differently than a clear daytime sky, and thus the system 200 may maintain display parameters for a nighttime profile and a daytime profile. The profiles may also or instead be based on a user. For example, a first user may respond to a particular configuration of display parameters differently than a second user, and thus the system 200 may maintain display parameters for a first user profile and a second user profile.

Figure 4:
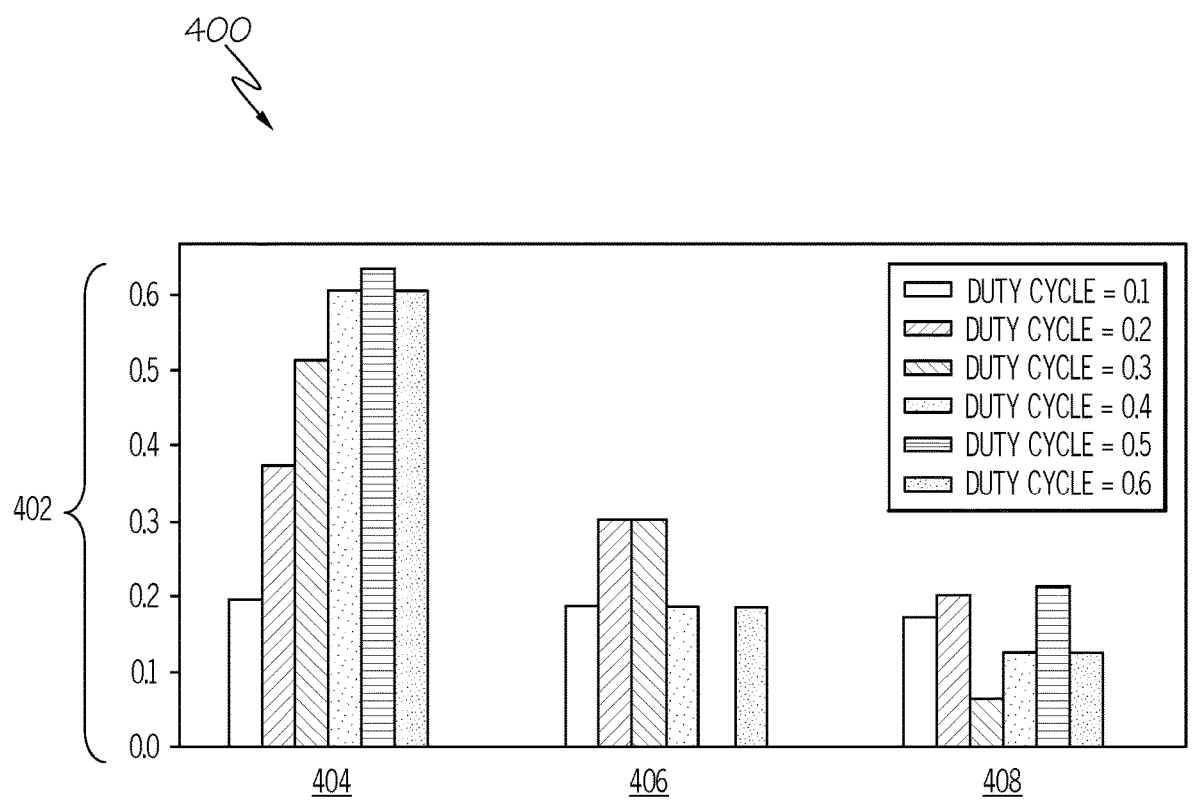
FIG. 4 depicts a diagram of illustrative brain activity responses to changes in duty cycle, according to one or more embodiments shown and described herein.

Referring now to FIG. 4, a diagram 400 of illustrative brain activity responses to changes in duty cycle is depicted. The diagram 400 shows a target frequency 404, a second harmonic frequency 406, and a third harmonic frequency 408 and their corresponding power spectral density 402 for a plurality of duty cycles. The duty cycle of the flickering of an icon is one display parameter that may be modified, which reflects the fraction of one period in which a visual stimulus is displayed. Modifying the duty cycle of the flickering behavior allows the system 200 to increase the amplitude of the second harmonic frequency while also suppressing the amplitude of the third harmonic frequency. The second harmonic frequency is more desirable than the third harmonic frequency from a BCI perspective because the fundamental target frequency along with the second harmonic can enhance the system 200 performance in SSVEP detection.

As shown in the diagram 400 of example brain activity, the second harmonic frequency 406 reaches its highest amplitude with 20% and 30% duty cycles. The second harmonic frequency 406 reaches its lowest amplitude when the duty cycle is 50%. The second harmonic frequency 406 is stronger than the third harmonic frequency 408 with the 20%, 30%, 40%, and 60% duty cycles. The system 200 may alternate between the target frequency 404 and the second harmonic frequency 406 to improve SSVEP detection performance because the target frequency 404 and the second harmonic frequencies 406 are generally the strongest of the target frequency 404 and its harmonics. Therefore, the system 200 may adjust between 20%, 30%, 40%, and 60% duty cycles when modifying the display parameters.

In some embodiments, the system 200 may rank the duty cycles to determine which duty cycles to try first when modifying the display parameters. For example, the 30% duty cycle may be ranked first because it achieves the strongest second harmonic frequency 406 while also maintaining a target frequency 404 stronger than the second harmonic frequency 406, and the 20% duty cycle may be ranked second because it achieves the strongest second harmonic frequency 406 while also maintaining a target frequency 404 stronger than the second harmonic frequency 406 though not quite as strong as the target frequency 404 of the 30% duty cycle.

Figure 5A:
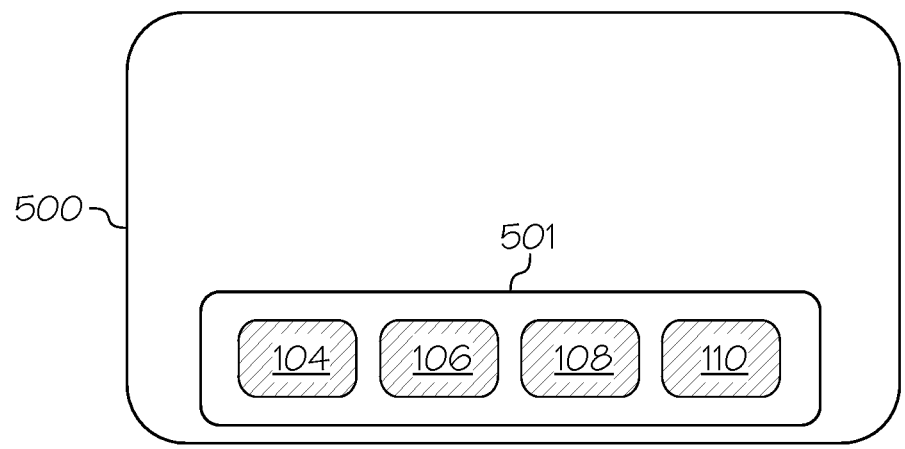
FIG. 5A depicts a first icon configuration, according to one or more embodiments shown and described herein.

Referring now to FIG. 5A, a first icon configuration 500 is depicted. An icon configuration may include display parameters such as icon color, background, arrangement, alignment with user's line of sight, and/or the like. The icons 104, 106, 108, 110 may be located on an electronic display (e.g., HUD 102). For example, the first icon configuration 500 may include the icons 104, 106, 108, 110 having a neutral color, such as grey. In some embodiments, the icons 104, 106, 108, 110 may each have different colors. The icons 104, 106, 108, 110 may be laid above an icon background 501 having a high contrast color, such as white. The high contrast color may be high contrast with regard to the icons 104, 106, 108, 110 and/or the electronic display of the first icon configuration 500. The icons 104, 106, 108, 110 may be in a 1×4 arrangement centered at the bottom of the electronic display of the first icon configuration 500 such that they are presented at the bottom of the user's field of view. In some embodiments, the icons 104, 106, 108, 110 may not be centered. In some embodiments, the icons 104, 106, 108, 110 may also have different shapes and/or sizes.

Figure 5B:
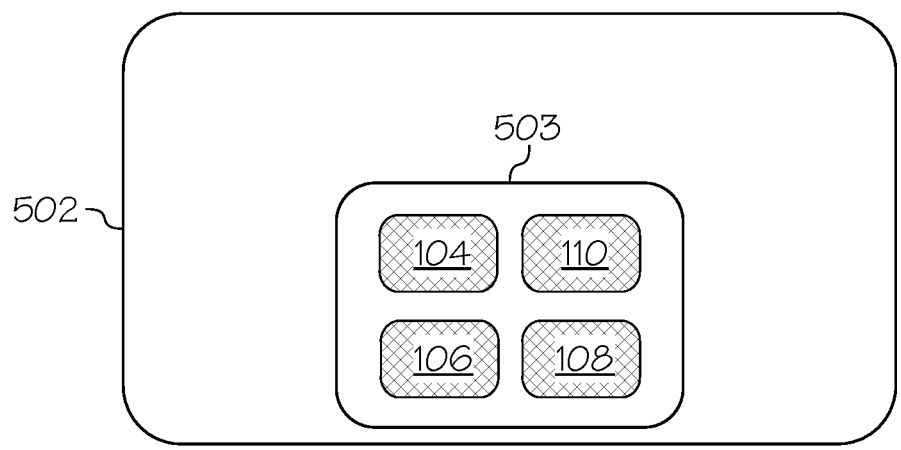
FIG. 5B depicts a second icon configuration, according to one or more embodiments shown and described herein.

Referring now to FIG. 5B, a second icon configuration 502 is depicted. An icon configuration may include display parameters such as icon color, background, arrangement, alignment with user's line of sight, and/or the like. The icons 104, 106, 108, 110 may be located on an electronic display (e.g., HUD 102). For example, the second icon configuration 502 may include the icons 104, 106, 108, 110 having a bright color, such as orange. The icons 104, 106, 108, 110 may be laid above an icon background 503 having a high contrast color, such as white. The high contrast color may be high contrast with regard to the icons 104, 106, 108, 110 and/or the electronic display of the second icon configuration 502. The icons 104, 106, 108, 110 may be in a 2×2 arrangement centered at the bottom of the electronic display of the first icon configuration 500 such that they are presented at the bottom of the user's field of view. In some embodiments, the icons 104, 106, 108, 110 may not be centered. In some embodiments, the icons 104, 106, 108, 110 may also have different shapes and/or sizes.

A trial test was performed comparing the 1×4 arrangement of the first icon configuration 500 with the 2×4 arrangement of the second icon configuration 502 on a single user. Five trials were completed at four frequencies with the 1×4 arrangement and the 2×4 arrangement each located at the bottom center or top left of an electronic display. The icon colors and background colors were consistent between each trial. SSVEP detection accuracy for the 1×4 arrangement was 80% at the bottom center of the electronic display and 90% at the upper left of the electronic display, for an 85% average overall. SSVEP detection accuracy for the 2×2 arrangement was 90% at the bottom center of the electronic display and 87.5% at the upper left of the electronic display, for an 88.7% average overall. It was thus determined that the average overall detection accuracy of the 2×2 arrangement results in slightly higher performance than the 1×4 arrangement configuration for this particular user. Based on this information a system 200 may set the default icon arrangement to 2×2 rather than 1×4 for the test subject.

Figure 5C:
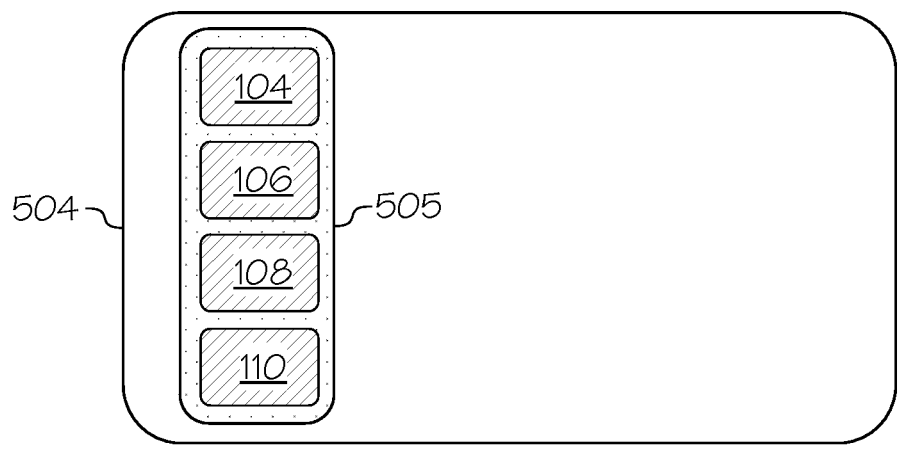
FIG. 5C depicts a third icon configuration, according to one or more embodiments shown and described herein.

Referring now to FIG. 5C, a third icon configuration 504 is depicted. An icon configuration may include display parameters such as icon color, background, arrangement, alignment with user's line of sight, and/or the like. The icons 104, 106, 108, 110 may be located on an electronic display (e.g., HUD 102). For example, the third icon configuration 504 may include the icons 104, 106, 108, 110 having a neutral color, such as grey. The icons 104, 106, 108, 110 may be laid above an icon background 505 having a low contrast color, such as black. The low contrast color may be low contrast with regard to the icons 104, 106, 108, 110 and/or the electronic display of the third icon configuration 504. The icons 104, 106, 108, 110 may be in a 4×1 arrangement aligned to the left of the electronic display of the third icon configuration 504 such that they are presented at the left of the user's field of view. In some embodiments, the icons 104, 106, 108, 110 may not be centered but may be closer to the top or bottom of the electronic display. In some embodiments, the icons 104, 106, 108, 110 may also have different shapes and/or sizes.

It should be understood that the display parameters are not limited to the first icon configuration 500, second icon configuration 502, or the third icon configuration 504 as shown and described herein. The display parameters for the plurality of icons comprise any variation of frequency, duty cycle, color, arrangement, position, background, and/or the like.

Figure 6A:
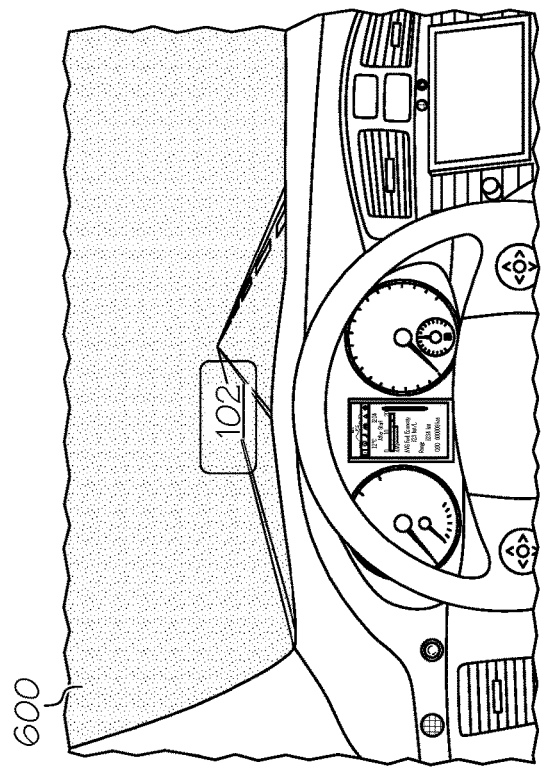
FIG. 6A depicts a first driving condition, according to one or more embodiments shown and described herein.

Referring now to FIG. 6A, a first driving condition in a first environment 600 is depicted. The discussion of FIGS. 6A-6C will be made with reference to FIG. 2. Because a HUD 102 permits visibility behind the display, the environment behind the HUD 102 may affect the user's SSVEP response to the stimulus (e.g., icons) presented on the HUD 102. Accordingly, the system 200 may choose to modify display parameters based on the driving environment.

To modify display parameters based on the driving environment, the system 200 may first establish a baseline level of environment activity. The level of environment activity may be based on an ambient light level determined by the sensor module 220 and/or a location determined by the location module 218. For example, the first environment 600 is a night environment that may have an ambient light measurement of 50 lux from headlights and/or street lights.

Periodically, the system 200 may also determine whether a level of environment activity has changed beyond a predetermined amount. If the environment activity has changed, the system 200 may also determine whether the change was significant enough to modify the display parameters. A change in environment activity may be considered sufficiently significant if the difference between the current environment activity and the baseline level of environment activity has surpassed a predetermined amount. For example, the predetermined amount may be 250 lux.

Lastly, the system 200 may modify the display parameters in response to determining that the level of environment activity has changed beyond a predetermined amount from the baseline level of environment activity. For example, if the predetermined amount is 250 lux, then moving from the first environment 600 (i.e., a night environment), having an ambient light measurement of 50 lux, to another environment (e.g., a sunrise environment), having an ambient light measurement of 400 lux, would trigger the SSVEP detection module 222 and cause it to modify the display parameters to ensure optimal SSVEP detection performance.

Figure 6B:
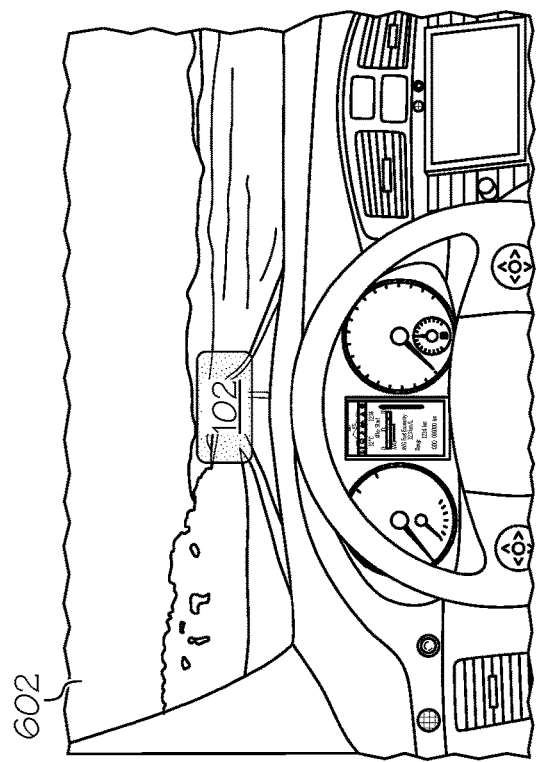
FIG. 6B depicts a second driving condition, according to one or more embodiments shown and described herein.

Referring now to FIG. 6B, a second driving condition in a second environment 602 is depicted. To modify display parameters based on the driving environment, the system 200 may first establish a baseline level of environment activity. The level of environment activity may be based on an ambient light level determined by the sensor module 220 and/or a location determined by the location module 218. For example, the second environment 602 is a daylight environment with clear skies that may have an ambient light measurement of 20,000 lux.

Periodically, the system 200 may also determine whether a level of environment activity has changed beyond a predetermined amount. If the environment activity has changed, the system 200 may also determine whether the change was significant enough to modify the display parameters. A change in environment activity may be considered sufficiently significant if the difference between the current environment activity and the baseline level of environment activity has surpassed a predetermined amount. For example, the predetermined amount may be 250 lux.

Lastly, the system 200 may modify the display parameters in response to determining that the level of environment activity has changed beyond a predetermined amount from the baseline level of environment activity. For example, if the predetermined amount is 250 lux, then as the sun begins to set, the second environment 602 (i.e., a daylight environment) having an ambient light measurement change from 20,000 lux to 400 lux, which would trigger the system 200 several times throughout and cause it to modify the display parameters to ensure optimal SSVEP detection performance in a darker environment.

Figure 6C:
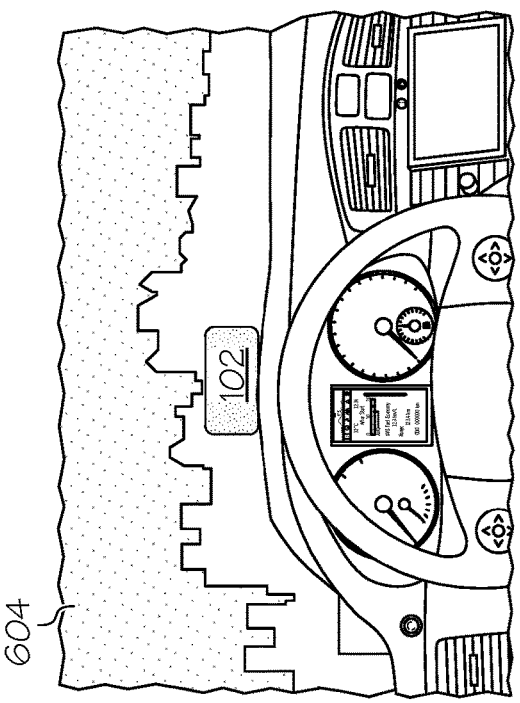
FIG. 6C depicts a third driving condition, according to one or more embodiments shown and described herein.

Referring now to FIG. 6C, a third driving condition in a third environment 604 is depicted. To modify display parameters based on the driving environment, the system 200 may first establish a baseline level of environment activity. Unlike the first environment 600 and the second environment 602, the level of environment activity in the third environment 604 may be based on a location determined by the location module 218. This is because ambient lighting may remain the same even when an environment because more active. For example, if the driver is driving from a rural environment as the sun is setting and arrives at the third environment 604 (e.g., a large city) when the sun has set, the ambient lighting may not have changed significantly but there may be many more lighting sources such as billboards, buildings, cars, and the like.

Periodically, the system 200 may also determine whether a level of environment activity has changed beyond a predetermined amount. If the environment activity has changed, the system 200 may also determine whether the change was significant enough to modify the display parameters. The predetermined amount may be a measurement of a location that correlates to an increase in the number of light sources that may be found in a city, such as population, geographic area, amount of highways, light pollution (or sky glow), and/or the like. For example, a change in location from an area with fewer light sources (e.g., a rural area) to an area with greater light sources (e.g., a city) may be represented by the location having greater levels of light pollution.

Lastly, the system 200 may modify the display parameters in response to determining that the level of environment activity has changed beyond a predetermined amount from the baseline level of environment activity. For example, if the location module 218 determines that the vehicle has entered the third environment 604 (e.g., a city) but the ambient lighting has not changed, the location module 218 may trigger the SSVEP detection module 222 and cause it to modify the display parameters to ensure optimal SSVEP detection performance in the third environment 604.

It should now be understood that embodiments disclosed herein include methods and systems for SSVEP detection optimization. Embodiments overcome visual distractions and optimize SSVEP detection by calibrating the presentation of the user interface to the user by modifying one or more display parameters. Embodiments modify parameters to maximize the SSVEP signals at a target frequency and the second harmonic of the target frequency to improve the performance of SSVEP detection. Embodiments may monitor for a threshold level of brain activity at a target frequency and a second harmonic of the target frequency. Embodiments may also or instead monitor for a change in the background environment, such as ambient light and/or location. When the brain activity at a target frequency and a second harmonic are not at the threshold and/or when the background environment has changed, the system may adjust its display parameters until brain activity at the target frequency and the second harmonic have returned to a threshold level.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method comprising:
measuring brain activity for a target frequency and a second harmonic frequency based on a default value of display parameters for a plurality of icons;
determining whether a strength of the target frequency and the second harmonic frequency are below a threshold level; and
modifying one or more display parameters in response to the strength of the target frequency and the second harmonic frequency being below the threshold level, wherein modifying the one or more display parameters comprises modifying one or more display parameters of the display parameters until the strength of the target frequency and the second harmonic frequency are at the threshold level.

2. The method of claim 1, further comprising measuring brain activity for a third harmonic frequency.

3. The method of claim 2, wherein the threshold level is greater than the third harmonic frequency.

4. The method of claim 1, further comprising:
establishing a baseline level of environment activity;
determining whether a level of environment activity has changed beyond a predetermined amount from the baseline level of environment activity; and
modifying one or more display parameters in response to determining that the level of environment activity has changed beyond a predetermined amount from the baseline level of environment activity.

5. The method of claim 4, wherein environment activity is based on an ambient light level, a location, or combinations thereof.

6. The method of claim 1, wherein the display parameters for the plurality of icons comprises at least one of frequency, duty cycle, color, arrangement, position, and background.

7. The method of claim 1, further comprising the default value of the display parameters to the modified display parameters.

8. A system comprising:
a processor;
an electronic display communicatively coupled to the processor;
a brain activity sensor communicatively coupled to the processor; and
a memory module communicatively coupled to the processor having machine-readable instructions that, when executed by the processor, cause the processor to perform operations comprising:
measuring brain activity for a target frequency and a second harmonic frequency based on a default value of display parameters for a plurality of icons;

determining whether a strength of the target frequency and the second harmonic frequency are below a threshold level; and modifying one or more display parameters in response to the strength of the target frequency and the second harmonic frequency being below the threshold level, wherein modifying the one or more display parameters comprises modifying one or more display parameters of the display parameters until the strength of the target frequency and the second harmonic frequency are at the threshold level.

9. The system of claim 8, wherein the machine-readable instructions cause the processor to perform operations further comprising measuring brain activity for a third harmonic frequency.

10. The system of claim 9, wherein the threshold level is greater than the third harmonic frequency.

11. The system of claim 8, wherein the machine-readable instructions cause the processor to perform operations further comprising:
establishing a baseline level of environment activity;
determining whether a level of environment activity has changed beyond a predetermined amount from the baseline level of environment activity; and
modifying one or more display parameters in response to determining that the level of environment activity has changed beyond a predetermined amount from the baseline level of environment activity.

12. The system of claim 11, wherein environment activity is based on an ambient light level, a location, or combinations thereof.

13. The system of claim 8, wherein the display parameters for the plurality of icons comprises at least one of frequency, duty cycle, color, arrangement, position, and background.

14. The system of claim 8, wherein modifying the one or more display parameters comprises modifying one or more display parameters of the display parameters until the strength of the target frequency and the second harmonic frequency are at the threshold level.

15. The system of claim 14, wherein the machine-readable instructions cause the processor to perform operations further comprising changing the default value of the display parameters to the modified display parameters.

16. A non-transitory computer-readable medium having machine-readable instructions that, when executed by a processor, cause the processor to perform operations comprising:
measuring brain activity for a target frequency and a second harmonic frequency based on a default value of display parameters for a plurality of icons;
determining whether a strength of the target frequency and the second harmonic frequency are below a threshold level; and
modifying one or more display parameters in response to the strength of the target frequency and the second harmonic frequency being below the threshold level, wherein modifying the one or more display parameters comprises modifying one or more display parameters of the display parameters until the strength of the target frequency and the second harmonic frequency are at the threshold level.

17. The non-transitory computer-readable medium of claim 16, wherein the machine-readable instructions cause the processor to perform operations further comprising measuring brain activity for a third harmonic frequency.

18. The non-transitory computer-readable medium of claim 16, wherein the machine-readable instructions cause the processor to perform operations further comprising:
establishing a baseline level of environment activity;
determining whether a level of environment activity has changed beyond a predetermined amount from the baseline level of environment activity; and
modifying one or more display parameters in response to determining that the level of environment activity has changed beyond a predetermined amount from the baseline level of environment activity.

19. The non-transitory computer-readable medium of claim 16, wherein:
the display parameters for the plurality of icons comprises at least one of frequency, duty cycle, color, arrangement, position, and background; and
modifying one or more display parameters comprises modifying one or more display parameters of the display parameters until the strength of the target frequency and the second harmonic frequency are at the threshold level.

* * * * *